United States Patent [19]

Weissmueller

[11] 4,228,461
[45] Oct. 14, 1980

[54] VERTICAL SYNCHRONIZATION SYSTEM

[75] Inventor: William R. Weissmueller, Wildwood, Ill.

[73] Assignee: Zenith Radio Corporation, Glenview, Ill.

[21] Appl. No.: 42,697

[22] Filed: May 25, 1979

[51] Int. Cl.$^2$ .............................................. H04N 5/04
[52] U.S. Cl. .................................................... 358/148
[58] Field of Search ....................... 358/148, 154, 155

[56] References Cited

U.S. PATENT DOCUMENTS 3,899,635   8/1975   Steckler et al. ....................... 358/148

Primary Examiner—Richard Murray
Attorney, Agent, or Firm—John H. Coult

[57] ABSTRACT

A two-mode digital vertical synchronization system is described for controlling the phase synchronization of vertical scan in a television receiver. In one mode, the system searches for incoming vertical sync pulses which occur during a wide sync "window". Sync pulses received during that window are utilized to initiate vertical scan. When the received sync pulses are in time-coincidence with an internal control signal generated at a standard line/frame rate, the system switches to a narrow window mode of operation. Vertical sync pulses received during a narrow sync window continue to initiate vertical scan. When a lack of time-coincidence between received vertical sync pulses and the control signal occurs for a predetermined interval, the system reverts to its wide window mode. Preferably, the locally generated control signal has a time duration sufficient to permit detection of coincidence between itself and a typical non-standard vertical sync pulse to hold the system in the narrow window mode, thus preventing oscillation between the narrow and wide window modes.

14 Claims, 3 Drawing Figures

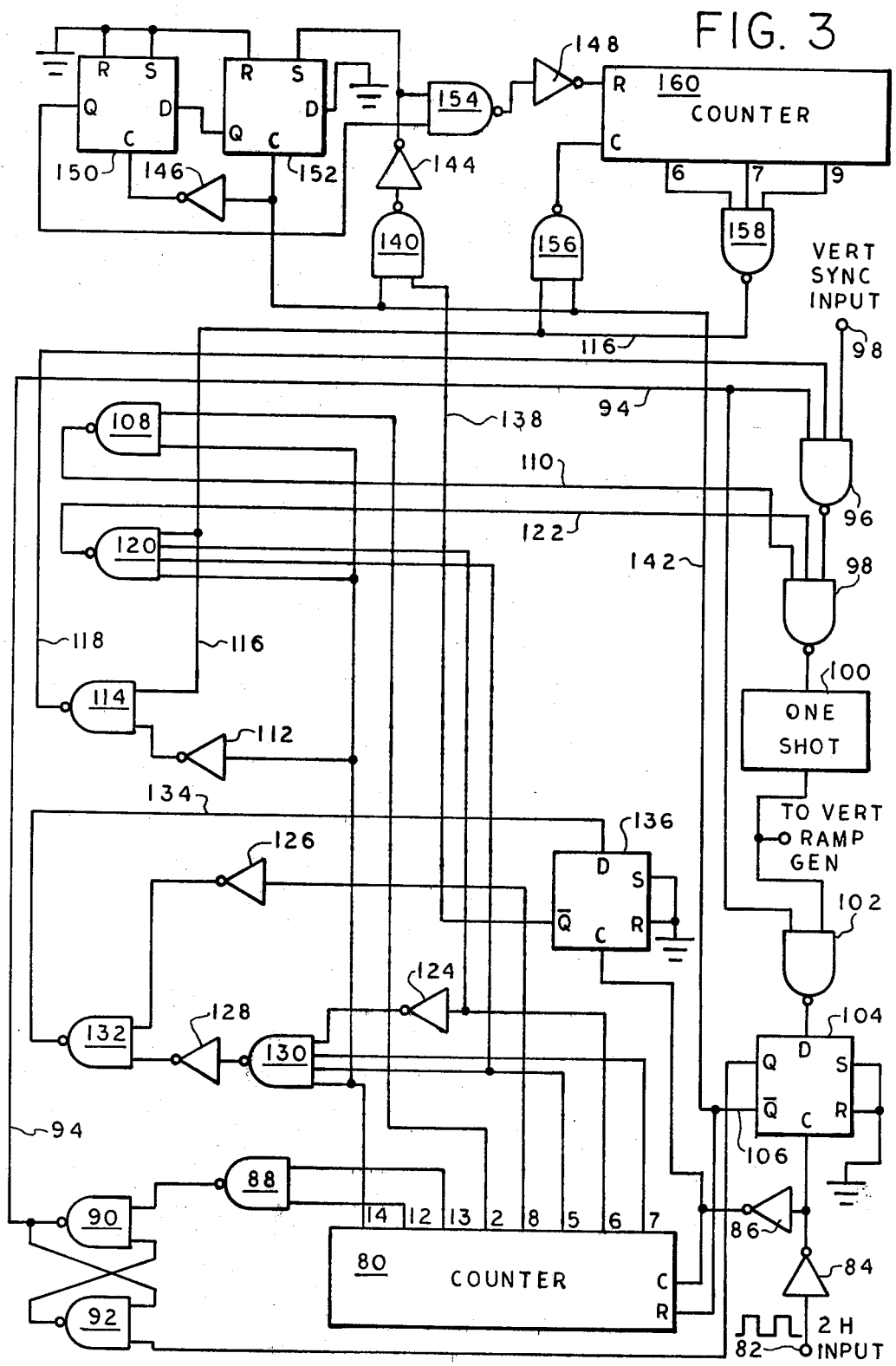

VERTICAL SYNCHRONIZATION SYSTEM

BACKGROUND OF THE INVENTION

The present invention relates generally to improvements in television receivers, and more particularly to vertical phase-lock systems for locking the receiver's vertical scan to the frequency and phase of received vertical sync (synchronization) pulses.

U.S. television standards call for a nominal line rate of 15,750 $H_z$ and a frame rate of 30 $H_z$. Hence, standard U.S. television signals may be said to have a nominal line rate/frame rate ratio of 525. This known ratio is employed in conventional synchronization systems for controlling the vertical scan of a television receiver. Typical of such conventional systems is one which generates clock pulses (2H pulses) of twice the standard television line frequency and counts 525 of such pulses to locally generate a vertical sync pulse. To lock the phase of the locally generated sync pulse to the phase of a sync pulse received as part of the composite television signal, a phase detector looks for coincidence between the locally generated sync pulse and the received sync pulse. When coincidence is detected, the locally generated sync pulse is employed to restart the counting of the 2H pulses and to initiate vertical scan. When a lack of coincidence is detected, the received sync pulse is utilized to restart counting of the 2H pulses and to initiate vertical scan. Typical of such systems are those disclosed in U.S. Pat. Nos. 3,691,297 and 3,916,102.

One situation which troubles synchronization systems of the type described above occurs when a non-standard television signal is received. For example, a non-standard signal may include vertical sync pulses which are related to twice their line frequency by a factor of 525.5 rather than the nominal factor of 525. When such a non-standard signal is received, the conventional system may oscillate between utilization of its locally generated vertical sync pulses and the received vertical sync pulses, thereby permitting the image generated by the television receiver to roll.

To offset the effect described above, it has been proposed to include a signal detector which examines the received television signal for the presence of equalizing pulses adjacent the received vertical sync pulse. When equalizing pulses are detected, the assumption is made that a standard television signal is being received and the system is permitted to operate normally as described above. When no equalizing pulses are detected, the assumption is made that a non-standard signal is received and the system is constrained to employ the received sync pulse for initiating vertical scan. Hence, the oscillation described above is avoided.

However, two drawbacks accompany the use of the signal detector described above. First, such a detector is complex and costly. In addition, the assumption that the presence of equalizing pulses indicates a standard television signal is not always correct. For example, some non-standard sources such as various tape record/playback machines provide equalizing pulses in their composite television signal. Consequently, the conventional system is "fooled" by the presence of such equalizing pulses, with the result that it alternates between using its locally generated sync pulses and the received sync pulses for initiating vertical scan. Because the locally generated sync pulse is not in exact time coincidence with the non-standard received sync pulse, the television picture rolls vertically. Hence, prior digital vertical synchronization systems have not been only relatively costly, but they have not consistently and reliably provided proper vertical scan in television receivers receiving non-standard signals.

OBJECTS OF THE INVENTION

It is a general object of the invention to provide an improved vertical synchronization system for television receivers.

It is a more specific object of the invention to provide a vertical synchronization system which is less costly than prior systems and which is more tolerant of non-standard vertical sync pulses.

It is another object of the invention to provide a vertical synchronization system which searches for and quickly locks on standard and non-standard vertical sync pulses and which excludes noise occurring outside a narrow time window encompassing the time of receipt of a vertical sync pulse.

BRIEF DESCRIPTION OF THE FIGURES

The above-stated objects and other objects of the invention are more particularly set forth in the following detailed description and in the accompanying drawings of which:

FIG. 3 is an exemplary circuit diagram of a vertical synchronization system for effecting the functions of the system shown schematically in FIG. 2.

DESCRIPTION OF THE PREFERRED EMBODIMENT

Figure 1:
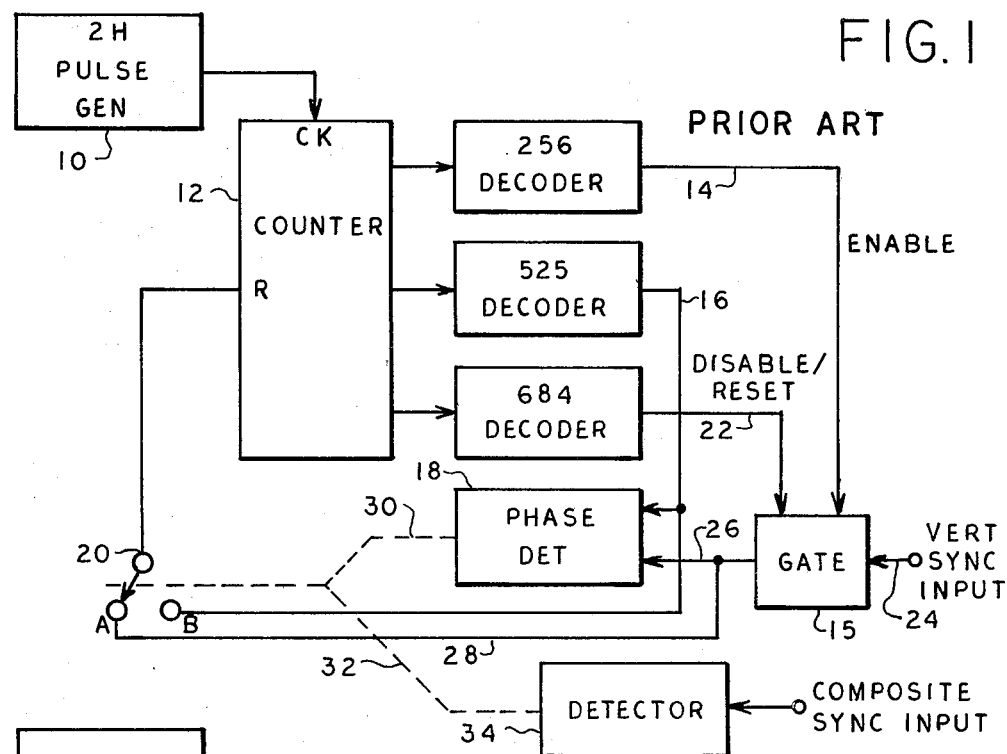
FIG. 1 illustrates a vertical synchronization system which is typical of the prior art.

Prior vertical synchronization systems have not been entirely satisfactory for the reasons stated above. To further illustrate some of the problems associated with the prior art and the significance of such problems, reference is made to FIG. 1 which illustrates a conventional vertical synchronization system.

In the illustrated system, a pulse generator 10 generates pulses at a rate of twice the television line rate or at a rate commonly known as "2H". The 2H pulses are received and counted by a counter 12 for driving a "256 decoder", a "525 decoder" and a "684 decoder". When the counter 12 reaches a count representative of a line rate/frame rate ratio of 256, the 256 decoder generates an enable signal at its output 14 for application to a gate 15. In response to the counter 12 reaching a count representative of a line rate/frame rate ratio of 525, the 525 decoder generates a signal at its output 16 for application to a phase detector 18 and to a contact B of a two-position switch 20. When the counter 12 reaches a count representative of a line rate/frame rate ratio of 684, the 684 decoder generates a disable/reset signal at its output 22 for application to the gate 15.

As described in more detail below, the gate 15 is "opened" during the interval between receipt of the enable signal from the 256 decoder and the disable/reset signal from the 684 decoder. When so opened, the gate 15 couples vertical sync pulses from its input 24 to the phase detector 18 via lead 26 and to contact A of the switch 20 via lead 28.

The system of FIG. 1 is adapted to be operated in two modes. In one mode, the switch 20 couples to the contact A for transmitting signals on the lead 28 to the reset (R) input of the counter 12. The signal applied to the reset input of the counter 12 is also applied by means not shown to a vertical scan generator for initiating vertical scan.

In the other mode of operation, the switch 20 couples to the contact B for transmitting signals on the lead 16 to the reset input of the counter 12 and to the vertical scan generator.

To control the position of the switch 20, the latter is coupled by an electronic link (indicated by dashed line 30) to the output of the phase detector 18. In addition, another electronic link (indicated by dashed line 32), couples the switch 20 to the output of a detector 34, the latter of which is described hereinafter.

The operation of the system shown in FIG. 1 is best explained by assuming that the gate 15 is receiving vertical sync pulses at its input 24 and that the switch 20 is coupled to the contact A. As the counter 12 counts the 2H pulses, it first reaches a count of 256, whereupon the 256 decoder generates an enable signal at its output 14. The latter signal operates to open the gate 15 to permit transmission of a received vertical sync pulse to the phase detector 180 and to the contact A. The counter is thus reset by the vertical sync pulse coupled by the switch 20 to the counter reset input, and vertical scan is initiated. Because the counter 12 has been reset, neither the 525 decoder nor the 684 decoder generate their outputs.

When the counter 12 again reaches a count of 256, the 256 decoder enables the gate 15. When the next vertical sync pulse is received by the gate 15, it will be in time coincidence with the counter 12 reaching a count of 525, because of the fact that the counter 12 was reset by the last received vertical sync pulse, and because standard television transmissions include vertical sync pulses having a nominal line rate/frame rate ratio of 525.

At this point in time, the phase detector 18 receives a signal developed by the 525 decoder and the vertical sync pulse from the gate 15. In addition, the vertical sync pulse is coupled from the gate 15 to the reset input of the counter 12 for resetting the latter.

In response to coincidence between its received inputs, the phase detector 18 couples the switch 20 to contact B. In this mode of operation, the output of the 525 decoder is utilized to reset the counter and to initiate vertical scan. The counter continues to be reset in this manner until the phase detector 18 senses a lack of time coincidence between the output of the 525 decoder and received vertical sync pulses.

Assuming now that the switch 20 is still coupled to contact B and that the transmission of vertical sync pulses ceases, the system will nevertheless "look for" sync pulses the next time the 256 decoder generates its output. At that time, the gate 15 is enabled to pass any vertical sync pulse that it may receive. Next, the 525 decoder applies its output to the phase detector 18. However, the phase detector receives no vertical sync pulse and, therefore, moves the switch 20 to contact A. Consequently, the counter 12 does not become reset. Rather, it reaches a count of 684, whereupon the 684 decoder applies its disable/reset signal to the gate 15. The latter event causes the gate 15 to close its input to sync pulses and to generate a signal at lead 28 for resetting the counter 12 and initiating vertical scan. This process continues as long as no vertical sync is received while the gate 15 is enabled. That is, during the interval or "window" between counts of 256 and 684, the gate 15 is open for receiving vertical sync pulses. If it receives none during that window, the counter is reset in response to the counter 12 reaching a count of 684.

When a vertical sync pulse is received within the window, it is coupled via the gate 15, contact A and the switch 20 to the reset input of the counter 12. Assuming that additional sync pulses are received, time coincidence will ultimately occur between them and the output of the 525 decoder, whereupon the phase detector 18 senses such coincidence and moves the switch 20 to contact B.

It will be seen, therefore, that the counter 12 is reset and vertical scan is initiated by the output of the 525 decoder as long as time coincidence is detected between received vertical sync pulses and the output of the 525 decoder. In this, its normal mode of operation, the switch 20 remains coupled to contact B, and any noise received at the input 24 of the gate 15 has very little effect on vertical synchronization.

When a lack of time coincidence between vertical sync pulses and the output of the 525 decoder is sensed, the switch 20 is moved to contact A. In this mode of operation, the gate 15 "searches for" incoming sync pulses during the 256-684 window. If none are found, the counter is reset when it reaches a count of 684, after which the system continues "searching for" a vertical sync pulse and resetting itself. When vertical sync pulses are again received at the proper time, the switch 20 is moved back to contact B and the normal mode of operation is resumed.

An additional aspect of systems such as that illustrated in FIG. 1 is the provision of a delay between the phase detector's sensing a lack of coincidence and the actuation of the switch 20. Typically, the phase detector 18 is designed to sense a lack of coincidence between vertical sync pulses and the output of the 525 decoder for an interval of approximately 8 television fields prior to actuating the switch 20. That is, the switch 20 is not moved from contact B to contact A until such a lack of coincidence is detected for eight consecutive television fields.

One drawback of the conventional system is best explained if it is assumed that vertical sync pulses having a non-standard line rate/frame rate ratio are received. For example, the gate 15 may receive vertical sync pulses whose line rate/frame rate ratio is 525.5. Because the phase detector 18 is generally incapable of sensing lack of coincidence between its nearly simultaneous inputs (the non-standard sync pulse and the output of the 525 decoder), it initially finds coincidence and keeps the switch 20 coupled to contact B, whereupon the system is reset by the 525 decoder. However, because the counter is reset and vertical scan is initiated non-synchronously with respect to the vertical sync pulses, the television picture begins to roll slowly. Eventually, the output of the 525 decoder will be far enough out of synchronism with the non-standard sync pulse for the phase detector 18 to detect that situation and move the switch 20 to contact B. When this occurs, the non-standard sync pulse is normally received within a few counts of the output of the 525 decoder. Hence, the non-standard sync pulses are received within the 256-684 window. Consequently, the next incoming sync pulse resets the counter 12 and initiates vertical scan. The next successive sync pulse occurs in close enough time proximity to the next successive output of the 525 decoder so that the phase detector senses coincidence, and the system reverts to the normal mode of operation wherein the switch 20 is coupled to the contact B. However, the picture rolls again and eventually the phase detector again senses a lack of coincidence. Accordingly, the system of FIG. 1 tends to oscillate between its normal mode of operation and its searching mode.

To overcome this problem it has been proposed to include the detector 34 which receives the composite sync signal and senses equalizing pulses or lack thereof adjacent the vertical sync pulses. If no equalizing pulses are sensed, it is assumed that a non-standard signal is being received, whereupon the detector 34 holds the switch 20 in coupling with the contact A. Hence, the oscillation described above is avoided. If equalizing pulses are sensed, it is assumed that a standard signal (line rate/frame rate ratio of 525) is received, whereupon the switch 20 is controlled by the phase detector 18 in the manner described above.

Although the system of FIG. 1 performs satisfactorily under many circumstances, it nevertheless has at least two drawbacks. One drawback is that the detector 34 is relatively complex, it requires an additional input pin for receiving composite sync when the system is constructed as an integrated circuit, and it adds expense to the system. Also, the inclusion of the detector 34 does not always avoid the problem discussed above in regard to oscillation.

Although many non-standard signals do not have equalizing pulses, it has been found that some non-standard signal sources do transmit the equalizing pulses. Some tape recorders, for example, generate non-standard rate vertical sync pulses accompanied by equalizing pulses. Because the detector 34 is incapable of recognizing such a non-standard rate sync signal, the system of FIG. 1 tends to oscillate.

To overcome the problems stated above, the synchronization system according to the invention operates in two modes, a wide sync window mode and a narrow sync window mode, and utilizes a received vertical sync pulse to initiate vertical scan in both modes. In the wide window mode, the system searches for incoming vertical sync pulses. Sync pulses received during the wide window reset a counter of the type described above and initiate vertical scan. The system then switches to a narrow window mode during which received sync pulses also reset the counter and initiate vertical scan. Thus, when sync pulses are received, the counter and the vertical scan are always synchronized with the received vertical sync pulses irrespective of which mode of operation the system is in. This avoids the problem which occurs in conventional systems in which an internally generated reset pulse is used to reset the counter when a received sync pulse in non-standard and slightly out of sync with the internally generated reset pulse.

In addition, the system is adapted to synchronize with non-standard vertical sync pulses received during the narrow window mode of operation. Consequently, the system does not switch back and forth between narrow window and wide window operation when non-standard sync pulses are received.

Figure 2:
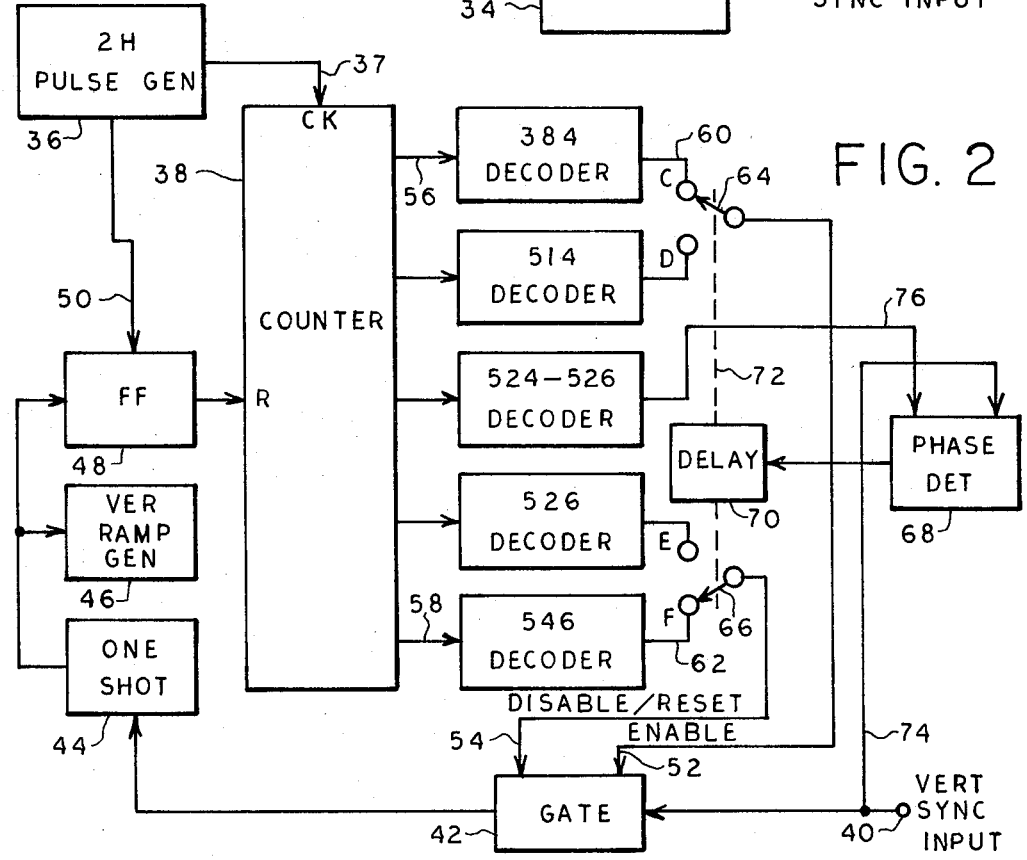
FIG. 2 depicts, in schematic form, a vertical synchronization system according to the invention.

An embodiment of the invention incorporating the features set forth above and other features described below is depicted in FIG. 2. As shown, the system includes a conventional pulse generator 36 receiving horizontal sync pulses for generating 2 H pulses, the latter of which are applied via lead 37 to the clock input of a conventional counter 38. When the counter 38 attains preselected counts, the system accepts incoming vertical sync pulses for resetting the counter and initiating vertical scan.

Vertical sync pulses are received at an input terminal 40 and coupled to a sync transmission path comprising a gate 42 and a one-shot multivibrator 44. The output of the one-shot 44 is coupled to the input of a vertical ramp generator 46 and a flip-flop 48. When triggered by the one-shot 44, the generator 46 initiates vertical scan retrace. The flip-flop 48 is coupled to the reset input of the counter 38 for resetting the latter to an initial count in response to being triggered by the one-shot 44 and clocked by a 2 H pulse received via a lead 50 from the pulse generator 36.

Referring to the gate 42, it operates to pass vertical sync pulses to the one-shot 44 only during wide and narrow sync windows. Sync pulses received at times outside the windows are inhibited by the gate 42 from traversing the transmission path.

To open the transmission path to vertical sync pulse, the gate 42 receives a "window-open" or enable signal at input 52. To close the transmission path to vertical sync pulses, the gate 42 receives a "window-close" or disable signal at its other input 54. The interval between receipt of a window-open signal and a window-close signal defines the sync window during which the gate 42 opens the transmission path so that vertical sync pulses are transmitted to the one-shot 44. As described in more detail below, a window-close signal at the input 54 also causes the gate 42 to trigger the one-shot 44 for initiating vertical scan retrace and for resetting the counter 38.

To initially synchronize vertical scan and the counter with received vertical sync pulses, the system operates in a wide sync window mode to search for and accept incoming vertical sync pulses. The wide sync window mode is effected by a first sync window generator which generates windown-open and window-close signals in response to the counter 38 reaching counts representative of selected line rate/frame rate ratios. In the embodiment of FIG. 2, the first sync window generator includes a "384 decoder" coupled via a lead 56 to one output of the counter 38, and a "546 decoder" coupled via a lead 58 to another output of the counter. When the counter 38 reaches a count representative of a line rate/frame rate ratio less than nominal by a selected count, preferably a count of 384, the 384 decoder generates a window-open signal at its output lead 60. When the counter 38 reaches a count representative of a line rate/frame rate ratio greater than nominal by a selected count, preferably a count of 546, the 546 decoder generates a window-close signal at its output lead 62.

To couple the windown-open and window-close signals to the gate 42, a mode control device is provided which includes switches 64 and 66. As shown, the switch 64 is movable between positions C (wide window mode) and D (narrow window mode), and the switch 66 is movable between positions E (narrow window mode) and F (wide window mode). In the positions shown in FIG. 1, switches 64 and 66 are both positioned for selecting the wide window mode. When the narrow window mode is to be effected, the switches 64 and 66 are simultaneously moved to positions D and E, respectively.

The movement of the switches 64 and 66 is effected by another portion of the mode-control device, shown as a phase detector 68 and a delay device 70, the latter of which functions to move the switches 64 and 66 as indicated schematically by the dashed line 72. As is described more fully hereinafter, such switch movements depend on the coincidence or lack thereof between a vertical sync pulse received by the phase detector 68 via lead 74 and a control signal received via a lead 76. The control signal is generated by a "524–526 decoder" when the counter 38 reaches a count representative of a line rate/frame rate ratio of approximately nominal.

Assuming that the switches are in the positions shown in FIG. 2, the counter 38 first reaches a count of 384, whereupon the 384 decoder generates a window-open signal for enabling the gate 42 via its input 52. Assuming no vertical sync pulse is received by the gate 42, the counter continues counting, eventually reaching a count approximately equal to the nominal line rate/frame rate ratio. Thereupon, the 524–526 decoder supplies the control signal to the phase detector 68. However, because no vertical sync pulse is received by the phase detector, the latter applies a non-coincidence signal to the delay device 70 for holding the switches 64 and 66 in their illustrated positions.

Eventually, the counter 38 reaches a count of 546, whereupon the 546 decoder generates a window-close signal at its output lead 62. That signal is applied to input 54 of the gate 42 for closing the transmission path and for actuating the gate 42 to trigger the one-shot 44. Hence, vertical scan retrace is initiated and the counter is reset to its initial count.

The operation described above continues repeatedly if no vertical sync pulses are received. That is, the system continues to open the transmission path for the duration of the wide sync window (384 to 546) and to thereafter close the transmission path, initiate vertical scan, and reset the counter 38.

Assuming now that a vertical sync pulse is received during the wide window mode described above, the gate 42 couples the vertical sync pulse to the one-shot 44 for triggering the vertical ramp generator 46 and the flip-flop 48. Thus, vertical scan is then initiated and, upon receiving a clock pulse from the generator 36, the flip-flop 48 resets the counter 38.

At this junction it should be noted that vertical scan is initiated immediately on reception of a vertical sync pulse. That is, the vertical sync pulse is not clocked to the ramp generator 46. Instead, the leading edge of a received vertical sync pulse is employed to trigger the one-shot 44 and to initiate vertical scan. Hence, even though the received vertical sync pulse may be non-standard and slightly out of sync with the 2 H pulses from the generator 36, the system nevertheless initiates vertical scan in synchronism with a received vertical sync pulse. Thus, for example, when a vertical sync pulse having a line rate/frame rate ratio of 525.5 is received, vertical scan is synchronized to that non-standard rate. This overcomes a problem with some conventional systems which clock the vertical sync pulse to the ramp generator 46. Such clocking of the vertical sync pulse causes vertical scan to be initiated slightly out of time synchronism with the received vertical sync pulse, thus causing the television picture to roll.

Having been reset by vertical sync pulse, the counter 38 begins counting anew. Once again, the 384 decoder enables the gate 42 for passing the next vertical sync pulse. When that next sync pulse is received, it is coupled to the one-shot 44 for initiating vertical scan and resetting the counter 38. Because the last vertical sync pulse is generally in time synchronism with the control signal generated by the 524–526 decoder, the phase detector 68 senses such synchronism and provides a coincidence signal to the delay device 70. Preferably the latter device delays the effect of the coincidence signal for an interval corresponding to two television fields. Hence, the delay device 70 does not yet move the switches 64 and 66 and the system remains in the wide window mode.

Assuming that vertical sync pulses of the same line rate/frame rate ratio continue to be received for two television fields, the phase detector 68 continues generating a coincidence signal, whereupon the delay device 70 operates to move the switches 64 and 66 to positions D and E, respectively. Consequently, wide window mode is terminated and the narrow window mode is initiated. In the narrow window mode, only sync pulses received in the interval between counts of 514 and 526 are coupled through the sync transmission path. Specifically, in the narrow window mode, the gate 42 is enabled by a window-open signal generated by a "514 decoder" in response to the counter 38 reaching a count representative of a line rate/frame rate ratio of 514. If no sync pulses are received prior to the counter 38 reaching a count representative of a line rate/frame rate ratio of 526, a "526 decoder" applies a window-close signal to the gate 42. In response to such a window-close signal, the gate 42 excludes further incoming sync pulses and triggers the one-shot 44 for initiating vertical scan and resetting the counter.

Generally, the system receives vertical sync pulses during the narrow window mode, and such sync pulses are in time coincidence with the control signal generated by the 524–526 decoder. Hence, the system remains in the narrow window mode, the gate 42 is enabled each time the counter 38 reaches a count representative of a line rate/frame rate ratio of 514, and the received vertical sync pulse initiates vertical scan and resets the counter 38.

Assuming now that vertical sync pulses cease, the phase detector 68 applies a non-coincidence signal to the delay device 70. However, the latter device delays the effect of the non-coincidence signal for an interval preferably equal to approximately eight television fields. Hence, if a sync pulse should again be received in synchronism with the generation of the control signal but before the eight television fields interval has elapsed, the system remains in the narrow window mode.

To reset the counter 38 and initiate vertical scan when no sync pulses are received during narrow mode operation, the 526 decoder generates a window-close signal when the counter 38 reaches a count indicative of a line rate/frame rate ratio of 526. In response to the window-close signal, the gate 42 closes the transmission path to vertical sync pulses, and triggers the one-shot 44. If the phase detector 68 continues to sense "no-coincidence" for eight consecutive fields, the delay device 70 moves the switches 64 and 66 to positions C and F, respectively, for effecting the wide window mode of operation.

It will be appreciated that the two mode system of FIG. 2 "searches" for incoming sync pulses during its wide window mode of operation, automatically resetting itself when none are received. After receiving a vertical sync pulse, the system synchronizes vertical scan and the counter with the received sync pulses and eventually switches to the narrow window mode of operation. In the latter mode, noise is excluded from the system by virtue of the transmission path being closed all but during the narrow window mode. Yet in both modes of operation, it is an incoming vertical sync pulse that initiates scan and resets the counter (assuming that a vertical sync pulse is received during a window). Hence, irrespective of whether a received vertical sync pulse is standard or non-standard, vertical scan is properly synchronized.

To maintain the system in the narrow window mode when non-standard signals are received, the 524-526 decoder preferably develops the control signal in response to the counter reaching a narrow range of counts (e.g. 524 through 526) encompassing the nominal or standard line rate/frame rate ratio of 525. That is, the control signals begin on a count slightly below nominal, 524, and continues through a count of slightly greater than nominal, 526. Hence, the phase detector 68 is permitted to detect coincidence between the control signal and a non-standard vertical sync pulse having a line rate/frame rate ratio of other than nominal, such as 525.5. Thus, with the system in the narrow mode, the detector 68 senses coincidence between the control signal and such non-standard vertical sync pulses, and maintains the system in the narrow mode of operation. In contrast, conventional systems such as that shown in FIG. 1 cause the vertical scan rate to correspond to a line rate/frame rate ratio of exactly 525, irrespective of the fact that their phase detectors are usually capable of detecting the occurrence of non-standard vertical sync pulses having a line rate/frame rate ratio of 525.5, for example.

The system of FIG. 2 may be thought of, therefore, as having a "coincidence window" defined by a narrow range of counts encompassing nominal. Any non-standard sync pulse within the "coincidence window" is treated, in effect, as a standard sync pulse.

As stated above, the delay device 70 operates to delay the effect of a coincidence signal for an interval equal to two television fields. The purpose of such delay is to avoid operating in the narrow window mode under certain circumstances. For example, when vertical sync pulses are received from a tape recorder running in a fast-forward or still frame mode, the line rate/frame rate ratio may alternate between 525 and 531 from field to field. If the narrow window mode were to be effected in response to a "525" sync pulse, the alternation between receipt of "525" and 531" sync pulses could cause the system to oscillate between the narrow and wide window modes. However, by requiring two consecutive fields of nearly nominal sync pulses, the system of FIG. 2 does not go into the narrow window mode of operation for vertical sync pulses which alternate between standard and very non-standard line rate/frame rate ratios.

It will be appreciated by those skilled in the art that the invention may be embodied in a variety of circuit configurations. One such exemplary configuration is shown in FIG. 3. The illustrated embodiment includes a counter 80 for counting 2 H pulses which are received from an input 82 and which are coupled to the clock input of the counter via inverters 84 and 86. The counter 80 may be a type CD 40-40 counter manufactured by the Radio Corporation of America, and, as shown, includes output pins 2, 5-8, and 12-14 for driving various decoders.

A 384 decoder includes NAND gates 88, 90, and 92, interconnected as shown and receiving the outputs from pins 12 and 13 of the counter 80 for developing a window-open signal at lead 94. The lead 94 is coupled to one input of another NAND gate 96, the latter of which also receives vertical sync pulses from an input 98.

The output of the gate 96 drives another NAND gate 98 which is, in turn, coupled to a one-shot 100. The output of the one-shot drives a vertical ramp generator and another NAND gate 102, the latter of which operates to trigger a flip-flop 104 for resetting the counter 80 via a lead 106.

A 546 decoder includes a NAND gate 108 receiving the outputs from pins 2 and 14 of the counter 80. When the latter reaches a count of 546, the gate 108 develops a window-close signal at lead 110 for application to the gate 98.

A 514 decoder includes an inverter 112 and another NAND gate 114. The inverter 112 receives the output from pin 14 of the counter 80 for driving one input of the gate 114. Another input to the gate 114 is received via a lead 116 for enabling the gate 114 when narrow window operation is desired. The output of the gate 114 is a windown-open signal on a lead 118 which is applied as another input to the gate 96.

A 526 decoder includes a NAND gate 120 having an input from the lead 116 and additional inputs from pins 5, 16 and 14 of the counter 80. The gate 120 develops at lead 122 a window-close signal which is applied to the gate 98.

A 524-526 decoder includes inverters 124, 126, and 128 and NAND gates 130 and 132. This illustrated combination of gates is responsive to the outputs at pins 5, 6, 7, 8, and 14 of the counter 80 for developing the control signal at lead 134. The latter lead couples the control signal to the "D" input of a flip-flop 136, the "C" input thereof being clocked by 2 H pulses from the inverter 86. In response to its inputs, the flip-flop 136 develops on lead 138 a signal which begins at a count of 524 and continues to a count of 526 for application to a NAND gate 140, the latter of which serves as a phase detector. A "coincidence window" is thus established during which the phase detector is enabled for sensing the occurrence of a vertical sync pulse.

The other input to the gate 140 is via a lead 142 from the $\overline{Q}$ output of the flip-flop 104. Whenever a vertical sync pulse is received during a window, the gate 140 receives a signal indicative of that occurrence via the lead 142. If that signal is time coincident with the signal on the lead 138, the gate 140 develops a "coincidence signal" at its output.

To delay the output of the gate 140, the latter is coupled to a delay device which includes inverters 144, 146, and 148, flip-flops 150 and 152, NAND gates 154, 156, and 158 and a counter 160, all interconnected as shown. Suffice it to say that the output of the delay device appears on the lead 116 and goes high after two consecutive fields of "coincidence" for enabling the gates 114 and 120, thereby to select the narrow window mode of operation. When a lack of coincidence is detected for eight consecutive fields, the signal on the lead 116 goes low for disabling the wide window mode, whereupon the narrow window mode of operation is in effect.

The operation of the FIG. 3 embodiment is generally as described above with reference to FIG. 2. Specifically, in the wide window mode of operation, the gates 90 and 92 generate a window-open signal on the lead 94. If a vertical sync pulse is received by the gate 96 during the wide window interval, the gate 98 triggers the one-shot 100 for initiating vertical scan and for resetting the counter 80. If no sync pulse is received, the gate 108 generates a window-close signal on the lead 110 for excluding incoming sync pulses and for triggering the one-shot 100.

If vertical sync pulses are received during the wide window and the gate 140 detects two consecutive fields of coincidence between the control signal and incoming sync pulses, the gates 114 and 120 are enabled for developing windown-open and window-close signals at leads 118 and 122 for narrow window operation. The window-open signal on lead 118 enables the gate 96 for passing vertical sync pulses to trigger the one-shot 100, and the window-close signal on the lead 122 causes the gate 98 to trigger the one-shot 100 for initiating vertical scan, resetting the counter 80, and excluding vertical sync pulses received outside the narrow window.

If the gate 140 detects a lack of coincidence between the control signal and received vertical sync pulses for eight consecutive fields, the delay device develops a signal on lead 162 for disabling narrow window operation and returning the system to wide window operation. Further switching between the two modes of operation occurs as described above with reference to FIG. 2.

It will be appreciated that the synchronization system described herein has several advantages over conventional systems. Among the more significant advantages is the tolerance of the disclosed system to non-standard signals. By creating the "coincidence window", the system synchronizes to vertical sync pulses having a near nominal line rate/frame rate ratio. In addition, the provision of two modes of operation causes the system to "search" for and quickly "lock" on incoming vertical sync pulses in a wide window mode and to switch to a narrow window mode to obtain better noise performance.

Although the invention has been described in terms of a preferred embodiment, it will be obvious to those skilled in the art that many modifications and alterations may be made thereto. For example, the various decoders may be responsive to line rate/frame rate counts other than those described above. In addition, the control signal may encompass different line rate/frame rate ratios. Accordingly, it is intended that all such modifications and alterations be included within the spirit and scope of the invention as defined by the appended claims.

What is claimed is:

1. In a vertical synchronization system for a television receiver receiving vertical sync pulses and having a local source of clock pulses whose frequency is a multiple of the nominal horizontal line frequency, a counter for counting the clock pulses, and means for enabling a vertical scan generator in response to the counter reaching a count representative of a nominal line rate/frame rate ratio coincidentally with receipt of a vertical sync pulse, the improvement comprising:

a first sync window generator, including means responsive to the counter reaching a first count representative of a line rate/frame rate ratio less than nominal for generating a first window-open signal, and means responsive to the counter reaching a second count representative of a line rate/frame rate ratio greater than nominal for generating a first window-close signal, the interval between said first window-open signal and said first window-close signal defining a wide sync window;

a second sync window generator, including means responsive to the counter reaching a third count representative of a line rate/frame rate ratio less than nominal but closer to nominal than the first count for generating a second window-open signal, and means responsive to the counter reaching a fourth count representative of a line rate/frame rate ratio greater than nominal but closer to nominal than said second count for generating a second window-close signal, the interval between said second window-open signal and said second window-close signal defining a narrow sync window;

means responsive to the counter reaching a count approximately equal to nominal line rate/frame rate ratio for generating a control signal;

a sync transmission path adapted to receive selected, time-spaced, window-open and window-close signals and vertical sync pulses, and responsive to receipt of said pulses in an interval between the received window-open and window-close signals for coupling said pulses to the vertical scan generator to initiate vertical scan and to the counter for resetting thereof to an initial count;

mode control means for applying said first window-open and window-close signals to said transmission path, and responsive to time-coincidence between said control signal and a received vertical sync pulse for removing said first window-open and window-close signals from said transmission path and for applying said second window-open and window-close signals to said transmission path, such that dual mode operation is effected wherein sync pulses received during the wide sync window initiate vertical scan and reset the counter, after which only sync pulses received during the narrow sync window initiate vertical scan and reset the counter to thereby exclude noise occurring outside the range of the narrow sync window.

2. The improvement as set forth in claim 1 wherein said control signal generator generates the control signal in response to the counter reaching a narrow range of counts encompassing the nominal line rate/frame rate ratio, whereby the receipt of vertical sync pulses having a line rate/frame rate ratio other than nominal but within said narrow range are detected as being time-coincident with said control signal, thereby maintaining the system in the narrow sync window mode of operation once that mode has been established.

3. The improvement as set forth in claim 2 further including means for delaying the removal of said first window-open and window-close signals from said transmission path for a plurality of television field intervals, thereby to inhibit the narrow sync window mode of operation during receipt of vertical sync pulses whose line rate/frame rate ratio alternates between nominal and non-nominal for consecutive television fields.

4. The improvement as set forth in claim 2 wherein said mode control means includes:

a phase detector responsive to time-coincidence between the control signal and a vertical sync pulse for generating a coincidence signal, and responsive to a lack of such time-coincidence for generating a non-coincidence signal; and coupling means responsive to said non-coincidence signal for coupling said first window-open and window-close signals to said sync transmission path, and responsive to said coincidence signal for coupling said second window-open and window-close signals to said transmission path.

5. In a vertical synchronization system for a television receiver receiving vertical sync pulses and having a local source of clock pulses whose frequency is a multiple of the nominal horizontal line frequency, a counter for counting the clock pulses, and means for enabling a vertical scan generator in response to the counter reaching a count representative of a nominal line rate/frame rate ratio coincidentally with receipt of a vertical sync pulse, the improvement comprising:

a first sync window generator, including means responsive to the counter reaching a first count representative of a line rate/frame rate ratio less than nominal for generating a first window-open signal, and means responsive to the counter reaching a second count representative of a line/rate frame rate ratio greater than nominal for generating a first window-close signal, the interval between said first window-open signal and said first window-close signal defining a wide sync window;

a second sync window generator, including means responsive to the counter reaching a third count representative of a line rate/frame rate ratio less than nominal but closer to nominal than the first count for generating a second window-open signal, and means responsive to the counter reaching a fourth count representative of a line rate/frame rate ratio greater than nominal but closer to nominal than said second count for generating a second window-close signal, the interval between said second window-open signal and said second window-close signal defining a narrow sync window;

gating means adapted to receive vertical sync pulses and selected window-open and window-close signals for coupling, to the vertical scan generator and to the counter, vertical sync pulses received during a sync window defined by the received window-open and window-close signals, for thereby initiating vertical scan and resetting the counter to an initial count, and responsive to a received window-close signal for triggering the vertical scan generator and resetting the counter when no vertical sync pulse is received during a sync window;

means responsive to the counter reaching at least one count approximately equal to nominal line rate/frame rate ratio for generating a control signal;

a detector responsive to time-coincidence between the control signal and a vertical sync pulse for generating a coincidence signal, and responsive to a lack of time-coincidence between the control signal and vertical sync pulses for generating a non-coincidence signal; and means responsive to said non-coincidence signal for coupling said first window-open signal and said first window-close signal to said gating means, and responsive to said coincidence signal for coupling said second window-open and window-close signals to said gating means, whereby vertical scan is initiated and the counter is reset by the first window-close signal until an incoming vertical sync pulse is received during the wide sync window, whereupon vertical scan is initiated and the counter is reset by the incoming vertical sync pulse, and when a vertical sync pulse is received in time coincidence with the generation of the control signal, a narrow sync window mode of operation is effected during which the received vertical sync pulse continues to initiate vertical scan and reset the counter, and noise received outside the narrow sync window is decoupled from the vertical scan generator and the counter.

6. The improvement as set forth in claim 5 further including a delay network for delaying the coincidence signal from said detector for a predetermined number of television fields to inhibit the narrow window mode of operation in response to received television signals whose line rate/frame rate ratio alternates between consecutive fields.

7. The improvement as set forth in claim 6 wherein said delay network is adapted to delay the non-coincidence signal from said detector for a selected number of television fields to avoid switching from the narrow sync window mode to the wide sync window mode until a lack of coincidence between the control signal and the vertical sync pulses has been detected for said selected number of consecutive fields.

8. The improvement as set forth in claim 6 wherein the coincidence signal is delayed for two television fields.

9. The improvement as set forth in claim 7 wherein the non-coincidence signal is delayed for eight television fields.

10. The improvement as set forth in claim 6 wherein said first sync window generator generates the first window-open signal at a count representative of a line rate/frame rate ratio of approximately 384, and generates the first window-close signal at a count representative of a line rate/frame rate ratio of approximately 546.

11. The improvement as set forth in claim 6 wherein said second sync window generator generates the second window-open signal at a count representative of a line rate/frame rate ratio of approximately 514, and generates the second window-open signal at a count representative of a line rate/frame rate ratio of approximately 526.

12. The improvement as set forth in claim 5 wherein said control signal generator is responsive to a narrow range of counts encompassing the nominal line rate/frame rate ratio, whereby the receipt of a television signal having a line rate/frame rate ratio other than nominal, but within said narrow range, does not cause the system to switch from the narrow sync window mode to the wide sync window mode.

13. The improvement as set forth in claim 12 wherein said narrow range of counts is selected to include counts representative of line rate/frame rate ratios of 522, 523, 524, 525 and 526.

14. The improvement as set forth in claim 5 further including pulse transmission means coupled between said gating means and the vertical scan generator and adapted to trigger the vertical scan generator in time-coincidence with a received vertical sync pulse.

* * * * *